US008491033B2

(12) United States Patent
Sakamaki et al.

(10) Patent No.: US 8,491,033 B2
(45) Date of Patent: Jul. 23, 2013

(54) DOOR TRIM FOR VEHICLE (75) Inventors: Ryousuke Sakamaki, Toyohashi (JP); Masaaki Shimizu, Toyohashi (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 13/286,568

(22) Filed: Nov. 1, 2011

(65) Prior Publication Data

US 2012/0119538 A1    May 17, 2012

(30) Foreign Application Priority Data

Nov. 11, 2010  (JP) ................................. 2010-253218
Mar. 8, 2011   (JP) ................................. 2011-050378

(51) Int. Cl.
*B60J 5/04*     (2006.01)

(52) U.S. Cl.
USPC ...................................................... 296/146.7

(58) Field of Classification Search
USPC ...................................................... 296/146.9
See application file for complete search history.

(56) References Cited

U.S. PATENT DOCUMENTS

| 5,147,105 | A  | * | 9/1992  | Ono et al. ................. 296/146.9 |
| 5,288,121 | A  | * | 2/1994  | Graves ....................... 296/146.9 |
| 5,469,667 | A  | * | 11/1995 | Le Marrec ................... 49/477.1 |
| 6,007,140 | A  | * | 12/1999 | Heitmann et al. ......... 296/146.9 |
| 6,213,536 | B1 | * | 4/2001  | Raisch et al. .............. 296/146.9 |
| 6,846,034 | B1 | * | 1/2005  | Angus et al. ............... 296/146.9 |
| 6,848,218 | B2 | * | 2/2005  | Langemann ................. 49/495.1 |
| 6,874,281 | B2 | * | 4/2005  | Fujita et al. .................. 49/490.1 |
| 8,256,823 | B2 | * | 9/2012  | Tamura ........................... 296/93 |
| 2004/0145213 | A1 | * | 7/2004 | Watanabe .................. 296/146.9 |
| 2006/0082189 | A1 | * | 4/2006 | Sultan et al. ............... 296/146.9 |
| 2006/0138801 | A1 | * | 6/2006 | Hashimoto et al. ........ 296/146.9 |
| 2006/0186695 | A1 | * | 8/2006 | Hiroe et al. ................ 296/146.9 |
| 2008/0122250 | A1 | * | 5/2008 | Lichter et al. ............. 296/146.9 |
| 2008/0122251 | A1 | * | 5/2008 | Okajima et al. ........... 296/146.9 |
| 2012/0223542 | A1 | * | 9/2012 | Nishimoto et al. ........ 296/146.9 |
| 2012/0267914 | A1 | * | 10/2012 | Thiele et al. .............. 296/146.9 |

FOREIGN PATENT DOCUMENTS

| JP | 62227810 A | * | 10/1987 |
| JP | 63061661 A | * | 3/1988  |
| JP | 63087311 A | * | 4/1988  |
| JP | 02037026 A | * | 2/1990  |
| JP | 02092717 A | * | 4/1990  |
| JP | 02200519 A | * | 8/1990  |
| JP | 02227324 A | * | 9/1990  |
| JP | 11072395 A |   | 3/1999  |

* cited by examiner

*Primary Examiner* — H Gutman (74) *Attorney, Agent, or Firm* — Caesar, Rivise, Bernstein, Cohen & Pokotilow, Ltd.

(57) ABSTRACT

A door trim for a vehicle is provided. The vehicle comprises a fixed body including an opening and a movable body that opens and closes the opening. At least one of the fixed body and the movable body includes an attachment portion. The door trim comprises an elongate shape and a cover. The cover is attached along the attachment portion in a manner to cover the attachment portion. The door trim comprises a reinforcing member for reinforcing the cover. The reinforcing member is provided between the cover and the attachment portion to directly oppose the attachment portion. At least one of the cover and the reinforcing member is directly assembled to the attachment portion.

11 Claims, 7 Drawing Sheets

DOOR TRIM FOR VEHICLE

The present invention relates to a door trim for a vehicle provided for at least one of a fixed body having an opening and a vehicle door including a movable body for opening or closing the opening.

BACKGROUND OF THE INVENTION

A door opens or closes an opening provided on the side or the rear of a vehicle. Conventionally, to protect at least a part of a planar member formed at the circumference of the door and a pillar, a door trim for a vehicle including a cover made of resin or rubber is attached to the planar member in a manner to cover the planar member. For example, see Japanese Laid-open Patent Publication No. 11-72395.

In the door trim for a vehicle of JP No. 11-72395A, the cover is attached to a door, and core metal that serves as a reinforcing member is embedded in the cover. The core metal extends in the longitudinal direction of the distal end of the door to reinforce the holding force of the door.

In the door trim for a vehicle, the cover is produced by extrusion molding. During the extrusion molding, the core metal is embedded in the cover by insert molding. Thus, operation in the manufacturing process such as positioning of the core metal during the molding is cumbersome. Development of a door trim for a vehicle that is easy to manufacture has been desired.

An object of the present invention is to provide a door trim for a vehicle that is easy to manufacture.

SUMMARY OF THE INVENTION

According to one aspect of the invention, a door trim for a vehicle is provided. The vehicle comprises a fixed body including an opening and a movable body that opens and closes the opening. At least one of the fixed body and the movable body includes an attachment portion. The door trim comprises an elongate shape and a cover. The cover is attached along the attachment portion in a manner to cover the attachment portion. The door trim comprises a reinforcing member for reinforcing the cover. The reinforcing member is provided between the cover and the attachment portion to directly oppose the attachment portion. At least one of the cover and the reinforcing member is directly assembled to the attachment portion.

DETAILED DESCRIPTION OF THE PREFERRED EMBODIMENTS

An embodiment of the present invention will be described with reference to the drawings. In the specification, unless otherwise indicated, "front" and "rear", "right" and "left" and "upper" and "lower" refer to the directions viewed in the direction from a vehicle body.

Figure 1:
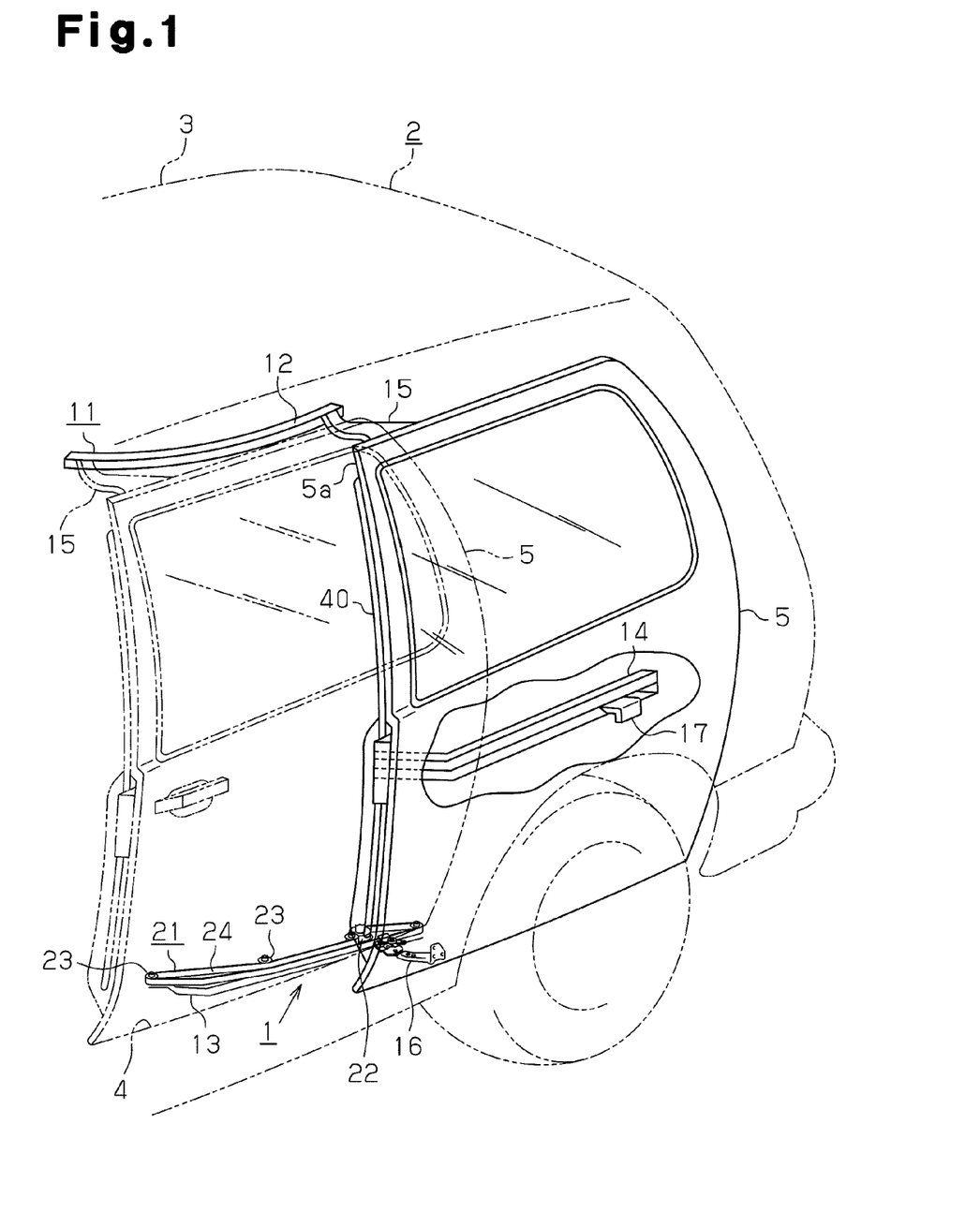
FIG. 1 is a perspective view of a vehicle equipped with an electric slide door apparatus.
Figure 2:
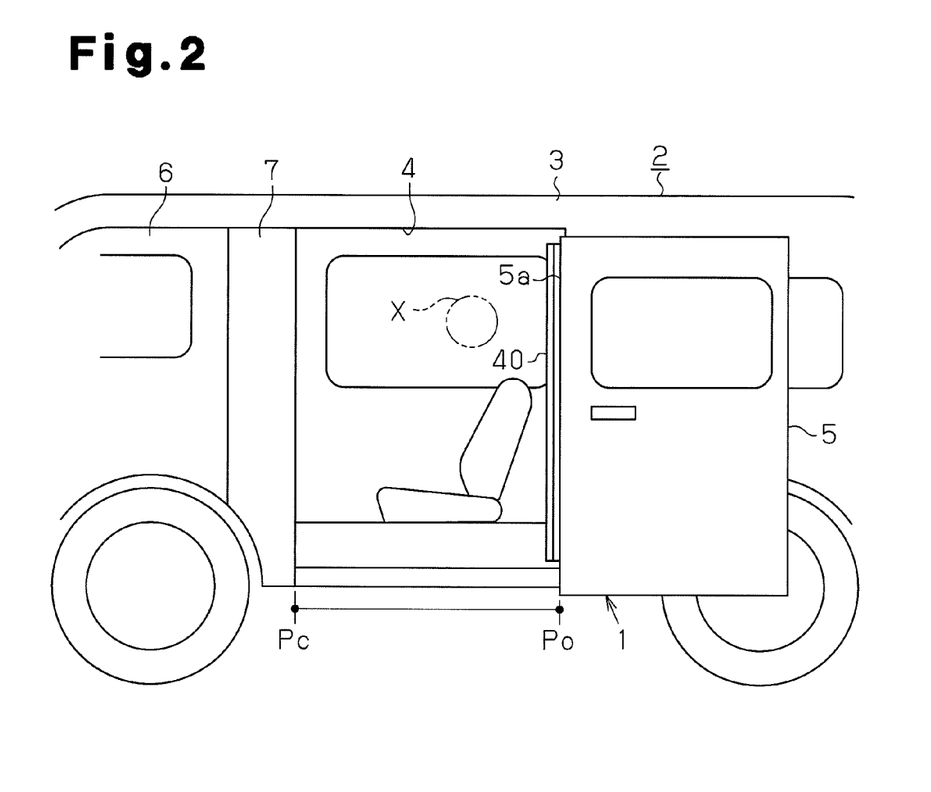
FIG. 2 is a side view of the vehicle of FIG. 1.

As illustrated in FIG. 1, a vehicle 2 equipped with an electric slide door apparatus 1 includes a vehicle body 3 made of a conductive metal material. A passenger's opening 4 for a passenger is formed on the left side of the vehicle body 3 in a square shape. The passenger's opening 4 is opened or closed with a door panel 5 that is formed of a conductive metal material in a square shape corresponding to the passenger's opening 4. As illustrated in FIG. 2, in front of the passenger's opening 4, a conductive door panel 6 next to a front passenger seat is provided, and a conductive center pillar 7 extends in a vertical direction between the door panel 5 (with the passenger's opening 4 closed) and the door panel 6.

As illustrated in FIG. 1, the door panel 5 is movably attached in generally front and rear directions with respect to the vehicle body 3 via an actuating mechanism 11 to selectively open and close the passenger's opening 4. An upper rail 12 and a lower rail 13, which constitute the actuating mechanism 11, are provided at an upper portion and a lower portion of the passenger's opening 4 of the vehicle 2, respectively. A center rail 14, which constitutes the actuating mechanism 11, is provided at a generally center portion of the vehicle 2 at the rear of the passenger's opening 4. Each of the rails 12 to 14 extends straight from the rear end toward the front end in the front and rear direction of the vehicle 2 and deflects on the way so that the front portion deflects toward the interior of the vehicle.

An upper arm 15, which constitutes the actuating mechanism 11, is fixed to the upper portion of the door panel 5 on the inside surface of the vehicle. A lower arm 16, which constitutes the actuating mechanism 11, is fixed to the lower portion of the door panel 5 on the inside surface of the vehicle. A center arm 17, which constitutes the actuating mechanism 11, is fixed to the inside surface of the vehicle at a predetermined position of the center. The upper arm 15, the lower arm 16, and center arm 17 are connected to the upper rail 12, the lower rail 13 and the center rail 14, respectively. Each of the arms 15 to 17 is guided by a corresponding one of the rails 12 to 14 to be movable in the front and rear direction of the vehicle 2.

Figure 4:
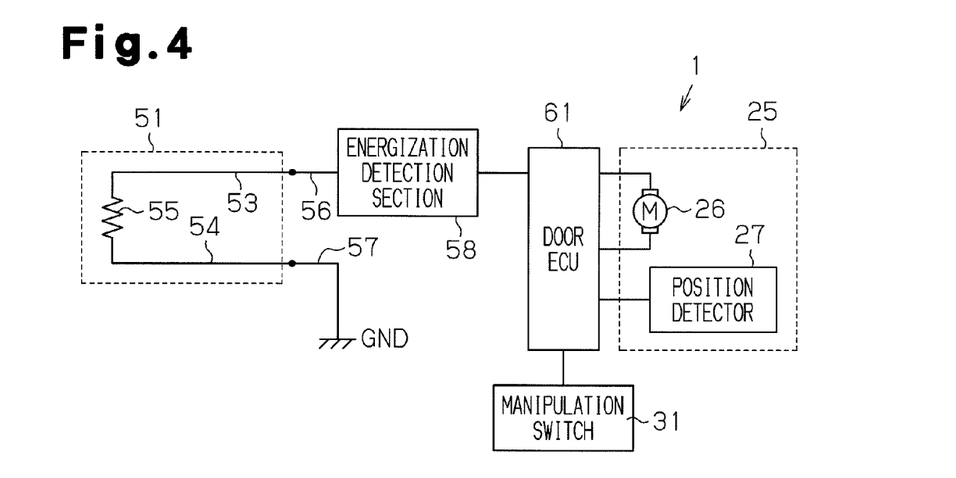
FIG. 4 is a block diagram of an electrical configuration of the electric slide door apparatus.

The lower arm 16 is moved in the front and rear direction of the vehicle 2 by drive force of the drive mechanism 21. In particular, a drive pulley 22 and driven pulleys 23, which constitute the drive mechanism 21, are provided at locations more inward in the vehicle than the lower rail 13 and rotate around axes that extend in a vertical direction of the vehicle 2. An endless belt 24 is hung over the drive pulley 22 and driven pulleys 23. A distal end of the lower arm 16 is fixed to the endless belt 24. As illustrated in FIG. 1 and FIG. 4, a slide actuator 25 is connected to the drive pulley 22. The slide actuator 25 constitutes the drive mechanism 21. The slide actuator 25 is disposed in the vehicle interior. The slide actuator 25 includes a slide motor 26 and a deceleration mechanism (not shown) that decreases the rotation of the slide motor 26 and outputs the reduced rotation. When the slide motor 26 is driven to rotate the drive pulley 22, the endless belt 24 is correspondingly rotated to move the lower arm 16 in the front and rear direction so that the door panel 5 is slidably moved in the front and rear direction.

In the slide actuator 25, a position detector 27 for detecting the rotation of the slide motor 26 is disposed. For example, the position detector 27 includes a permanent magnet and a Hall IC (not shown) opposing the permanent magnet. The permanent magnet integrally rotates with the rotational shaft (not shown) of the slide motor 26 or integrally rotates with a reduction gear (not shown) constituting the deceleration mechanism. The Hall IC outputs a pulse signal, as a position detection signal, corresponding to changes in the magnetic field of the permanent magnet relative to the Hall IC caused by rotation of the permanent magnet.

As illustrated in FIG. 2 and FIG. 4, the electric slide door apparatus 1 includes a manipulation switch 31 for directing the opening or closing of the door panel 5. When manipulated by a person such as a passenger of the vehicle 2 to open the passenger's opening 4, the manipulation switch 31 outputs an open signal to slidably move the door panel 5 to open the passenger's opening 4. On the other hand, when manipulated by a person such as a passenger to close the passenger's opening 4, the manipulation switch 31 outputs a close signal to slidably move the door panel 5 to close the passenger's opening 4. The manipulation switch 31 is provided at a predetermined location in the vehicle (e.g., (dashboard), a door lever (not shown) of the door panel 5, a portable item (not shown) carried with an ignition key, or the like.

Figure 5:
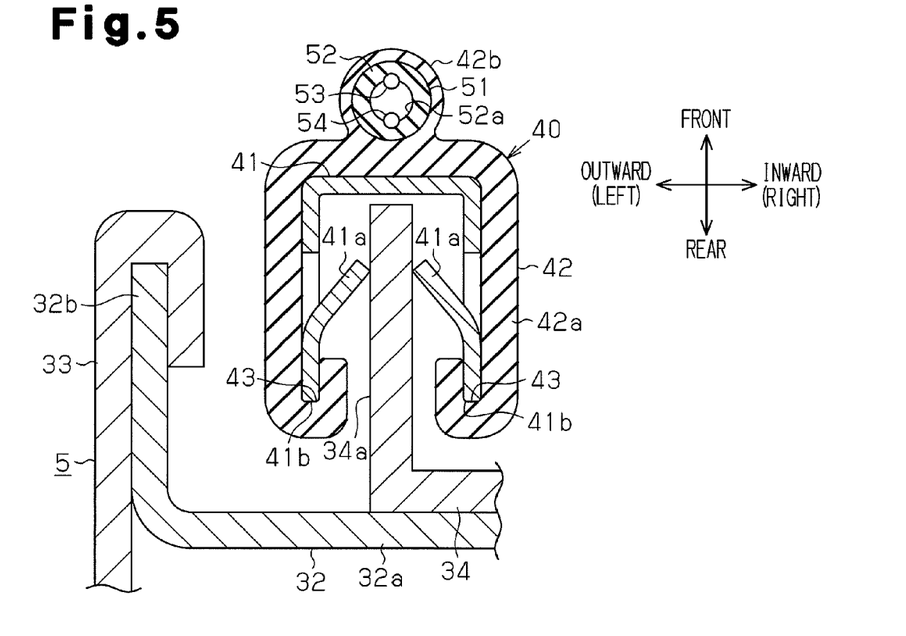
FIG. 5 is a cross-sectional view of a door trim according to a first embodiment.

A door trim for a vehicle (referred to as simply "door trim" hereinafter) 40 is fixed to the electric slide door apparatus 1 from the front portion 5a of the door panel 5 made of a hard metal member. An outer surface of the door trim 40 is made of rubber or resin. As illustrated in FIG. 5, an inner panel 32 constituting the door panel 5 includes a fixed portion 32a and an extended portion 32b. The fixed portion 32a is formed at the front end of the inner panel 32 (front end of the vehicle 2) in generally parallel with the right-and-left direction (width direction) of the vehicle 2. The extended portion 32b extends from the left end (outward end) of the fixed portion 32a toward the front side of the vehicle 2. A distal end of the extended portion 32b is covered with an outer panel 33 constituting the door panel 5. A bracket 34 is fixed to the fixed portion 32a at the front side of the vehicle 2 and includes a projecting wall 34a that extends in a forward direction of the vehicle 2.

The door trim 40 includes a clip 41 serving as a reinforcing member and a cover 42 that engages with the clip 41. The clip 41 is formed of metal material and directly attached to the projecting wall 34a serving as an attachment piece. The cover 42 is formed of rubber.

As illustrated in FIG. 5, the clip 41 of the door trim 40 has a channel-like cross-sectional area with one side thereof open. The clip 41 includes a pair of holding portions 41a formed by cutting the center portions of the clip from the front and raising the cut portions inward in the width direction of the clip 41. The opening of the clip 41 is inserted from the front portion to the rear portion of the projecting wall 34a, and the holding portions 41a hold the projecting wall 34a of the door panel 5 in a fixedly assembled way. In this embodiment, the assembling direction of the clip 41 is the rear direction of the vehicle 2.

Figure 3:
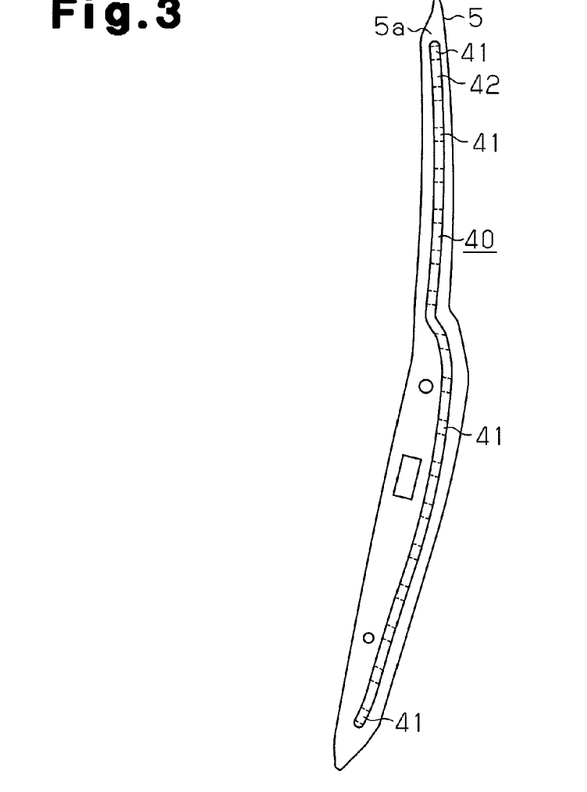
FIG. 3 is a plan view of a door panel viewed in the forward direction.

As illustrated in FIG. 3, the cover 42 of the door trim 40 is elongate and as long as the vertical length of the door panel 5. The clips 41 are positioned at equal distances in the door panel 5.

As illustrated in FIG. 5, the cover 42 includes a main body 42a to which the clip 41 is insertable. The main body 42a is fixed to the clip 41. Fitting portions 43 are formed at the rear of the main body 42a and folded over inward in the width direction of the main body 42a. Rear ends 41b of the clip 41 are fitted in the fitting portions 43. The fitting portions 43 serves as engagement portions in an assembling direction.

The cover 42 also has a sensor holder 42b integrally formed with the main body 42a. The sensor holder 42b holds a foreign object detection sensor 51 for detecting a foreign object X (see FIG. 2) present between the front portion 4a of the door panel 5 and the periphery of the passenger's opening 4.

In the door trim for a vehicle 40 configured as above, when the cover 42 is coextruded, the fitting portions 43 are shaped simultaneously. After the cover 42 is extrusion molded, the clip 41 is press-fitted to assemble the clip 41 with the cover 42.

As illustrated in FIG. 5, a hollow insulator 52 constituting the foreign object detection sensor 51 is formed of an elastically deformable insulator having insulation properties and restoring properties, such as soft resin or rubber. The hollow insulator 52 has a generally cylindrical shape. A spacing hole 52a provided at the radial center of the hollow insulator 52 extends through the longitudinal direction of the hollow insulator 52.

A pair of detection electrodes 53 and 54 are disposed inside the hollow insulator 52 and supported with the hollow insulator 52. Each detection electrode 53, 54 includes a flexible central electrode (not shown) formed by twisting conductive lines and an annular conductive cover layer (not shown) covering an outer periphery of the central electrode. The two detection electrodes 53 and 54 are spaced away from each other inside the hollow insulator 52 and each electrode 53, 54 extends spirally in a longitudinal direction of the hollow insulator 52. In this embodiment, a pair of the detection electrodes 53 and 54 disposed inside the hollow insulator 52 oppose one another in a diametrical direction at any position along the longitudinal direction of the hollow insulator 52. One half of the detection electrode 53 and 54 in a circumferential direction are embedded in the hollow insulator 52.

As illustrated in FIG. 4, a resistor 55 is connected between the two detection electrodes 53 and 54 at the position drawn from one longitudinal end of the hollow insulator 52. Feeder cables 56 and 57 for supplying the detection electrodes 53 and 54 with electricity are connected with the detection electrodes 53 and 54, respectively, at the position drawn from the other longitudinal end the hollow insulator 52.

The feeder cables 56 and 57 are drawn inside the door panel 5. The feeder cable 56 connected with the detection electrode 53 is electrically connected with an energization detection section 58 (see FIG. 4). The feeder cable 57 connected with the detection electrode 54 is connected to the ground GND (i.e., connected with a vehicle body). The energization detection section 58 constitutes the foreign object detection sensor 51.

As illustrated in FIG. 4, the energization detection section 58 supplies the detection electrode 53 with current via the feeder cable 56. As illustrated in FIG. 4, when the foreign object detection sensor 51 is in a normal condition where pressure is not applied to the sensor 51, the current flowing from the energization detection section 58 to the detection electrode 53 flows through the resistor 55 to the detection electrode 54. Meanwhile, as illustrated in FIG. 4, when pressure is applied to the sensor 51 in a manner to collapse the sensor 51 in a diametrical direction, the hollow insulator 52 elastically deforms and the detection electrode 53, 54 are bent accordingly. Then, the detection electrode 53 and the detection electrode 54 contact to shunt. Then, the current flowing from the energization detection section 58 to the detection electrode 53 does not pass through the resistor 55. Accordingly, when current is supplied to the detection electrode 53 at a certain voltage, a current value changes. The energization detection section 58, by detecting the change in the current value, detects the presence of the pressure to the detection sensor 51. Then, when detecting the change in the current value, the energization detection section 58 outputs a contact detection signal to a door ECU 61, which will be described below. When the pressure applied to the detection sensor 51 is removed, the hollow insulator 52 and then the detection electrode 53, 54 are restored. Then, these members are returned to a non-energized state.

As illustrated in FIG. 4, the electric slide door apparatus 1 of the present embodiment is controlled by the door ECU 61 serving as control means. The door ECU 61 has a ROM (Read Only Memory) and a RAM (Random Access Memory), and serves as a microcomputer. For example, the door ECU 61 is positioned near the slide actuator 25, and supplied with electricity from a battery (not shown) of the vehicle 2. Then, the door ECU 61 controls the slide actuator 25 based on the various signals input from the manipulation switch 31, the position detector 27 and the energization detection section 58.

Next, the overall operation of the electric slide door apparatus 1 as configured above will be described.

When an open signal is input from the manipulation switch 31, the door ECU 61 drives the slide actuator 25 to open the door panel 5. The door ECU 61 recognizes the position of the door panel 5 based on the position detection signal input from the position detector 27. In this embodiment, the door ECU 61 counts the number of pulses of the position detection signal and recognizes the position of the door panel 5 based on the counted value. Then, when the door panel 5 is located in the full open position $P_O$ (see FIG. 2) where the passenger's opening 4 is fully opened, the door ECU 61 stops the slide actuator 25.

Meanwhile, a close signal is input from the manipulation switch 31, the door ECU 61 drives the slide actuator 25 to close the door panel 5. Then, when the door panel 5 is located to the full close position Pc (see FIG. 2) where the passenger's opening 4 is fully closed, the door ECU 61 stops the slide actuator 25. During the closing operation of the door panel 5, when a foreign object X contacts the foreign object detection sensor 51 and presses the sensor 51, the hollow insulator 52 is elastically deformed to cause a pair of the detection electrodes 53 and 54 to shunt. As a result, the current amount supplied to the detection electrode 53 changes, and the energization detection section 58 outputs the contact detection signal to the door ECU 61. Upon input of the contact detection signal, the door ECU 61 inverts the slide actuator 25 and stops the slide actuator 25 after closing the door panel 5 by a predetermined distance.

Next, the operation and advantages characteristic of the present embodiment will be described.

(1) The clip 41 that reinforces the cover 42 is provided on the cover 42 in a manner that the clip 41 directly opposes the projecting wall 34a between the cover 42 and the projecting wall 34a. The clip 41 is directly fixed to the projecting wall 34a. Conventionally, when a reinforcing member is embedded in the cover, the reinforcing member need to be insert-molded at the same time as the cover is co-extruded. However, in the present embodiment, the clip 41 that reinforces the cover 42 directly opposes the projecting wall 34a between the cover 42 and the projecting wall 34a, not embedded in the cover 42. Thus, after the cover 42 is co-extruded, the clip 41 can be attached to the cover 42. Thus, a cumbersome task such as precise positioning of the clip 41 at the time of co-extrusion of the cover 42 is eliminated. Manufacture of the door trim 40 becomes easier.

(2) In the cover 42, the fitting portions 43 that serve as engaging portions are provided. The fitting portions 43 engage with the clip 41 in a direction opposite from the direction in which the clip 41 is assembled to the projecting wall 34a. In this configuration, the fitting portion 43 can prevent disengagement of the cover 42 from the clip 41 in a direction opposite from the assembling direction between the cover 42 and the clip 41.

(3) The clip 41 includes holding portions 41a that elastically hold the projecting wall 34a. The projecting wall 34a serves as an attachment piece constituting an attachment portion. With this configuration, the clip 41 and the door trim 40 can be attached to the projecting wall 34a easily via elastic holding.

(4) The holding portions 41a are integrally formed by cutting and raising a part of the clip 41. With this configuration, the holding portions 41a can be formed easily without the need of another member.

(5) A plurality of the clips 41 are provided with respect to the cover 42 and positioned at predetermined intervals along the longitudinal direction of the cover 42. By positioning a plurality of clips 41 that is harder than the cover 42 like this, the clips 41 can be positioned even in the curved portion of the door panel 5.

(6) In the cover 42, the sensor holder 42b for holding the foreign object detection sensor 51 is provided. Thus, by holding the foreign object detection sensor 51 with the sensor holder 42b, a foreign object between the door panel 5 and the center pillar 7 can be detected.

(7) The clip 41 and the cover 42 are independent. Thus, the door trim 40 (the cover 42) can be held in a desired position with respect to the door panel 5. This increases the freedom of design as well as contributes to a reduction in costs.

Second Embodiment

A second embodiment of the present invention will be described with reference to the drawings. Like members as in the first embodiment are denoted as like numerals, and all or a part of the drawings and the description of like members are omitted. In the second embodiment, the door trim 40 attached to the door panel 5 on the right side of the vehicle body 3 will be explained.

Figure 9:
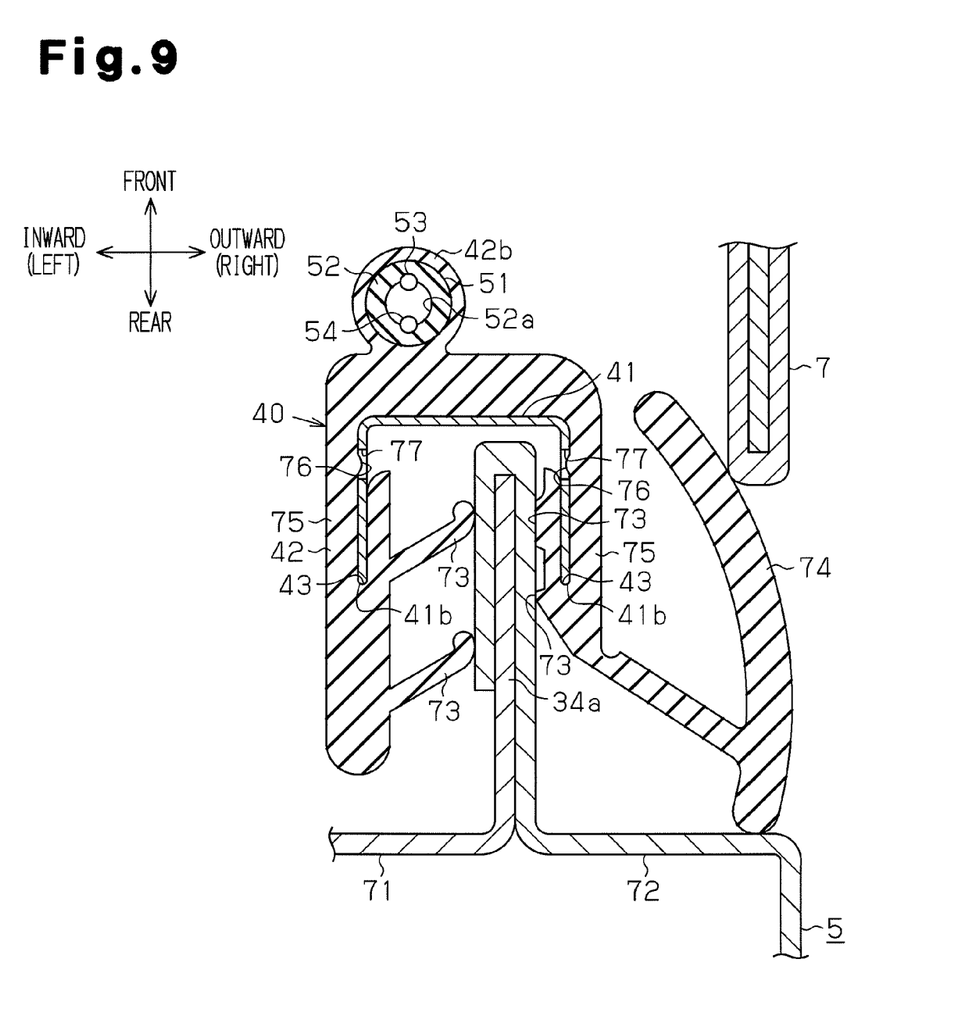
FIG. 9 is a cross-sectional view of the door trim for a vehicle according to the second embodiment.

As illustrated in FIG. 9, a projecting wall 34a that protrudes frontward the vehicle 2 is provided at the front portion 5a of the door panel 5. The projecting wall 34a is formed from an inner panel 71 and an outer panel 72 that constitute the door panel 5. The projecting wall 34a extends from an upper end of the door panel 5 to a lower end of the door panel 5 along the front portion 5a of the door panel 5. The door trim 40 has a cover 42 having a channel like-cross sectional area and holding portions 73 protruding from the inside portions of the cover 42 in the width direction of the cover 42. The door trim 40 is fixed to the front portion 5a of the door panel 5 by pressing the projecting wall 34a into the holding portions 73.

Figure 8:
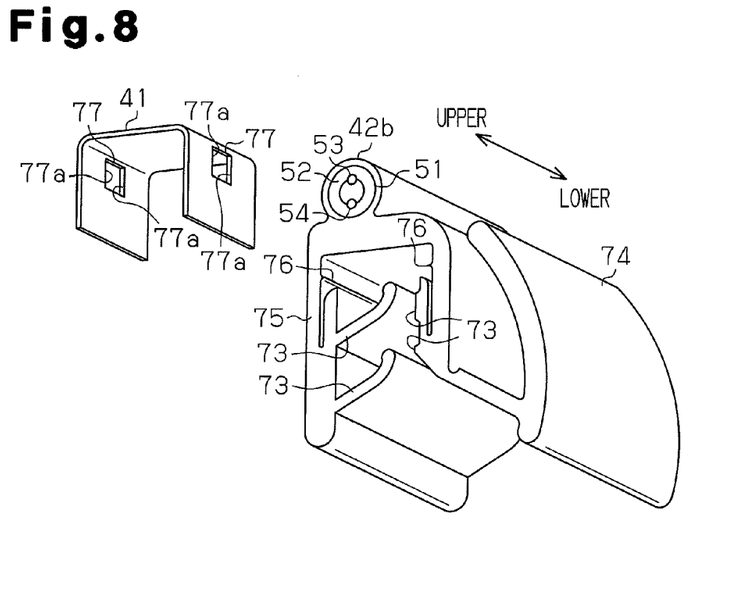
FIG. 8 is a perspective view of a door trim for a vehicle according to a second embodiment.

As illustrated in FIGS. 8 and 9, the door trim 40 of this embodiment includes a sealing portion 74 at the cover 42. The sealing portion 74 extends from a rear end of the cover 42 on the rear side of the vehicle 2 (see FIG. 2) toward outward the vehicle 2. Specifically, the sealing portion 74 extends from the cover 42 to outward the vehicle in a width direction of the vehicle. Then, the sealing portion 74 extends frontward the vehicle 2 and a distal end of the sealing portion 74 is curved toward inward the vehicle. The shape of the sealing portion 74 is generally in an L-form when viewed from an upper side of the vehicle 2. The sealing portion 74 extends generally along the entire range of the cover 42 in a longitudinal direction of the cover 42 (vertical direction of the vehicle 2). The sealing portion 74 prevents ingress of water from the space between the center pillar 7 and the door panel 5 when the passenger's opening 4 is fully closed. When the door panel 5 fully closes the passenger's opening 4, an outer (right) side of the sealing portion 74 outward of the vehicle is flush with the outer (right) side of the door panel 5 and an outer (right) side of the center pillar 7.

As illustrated in FIG. 8 and FIG. 9, protrusions 76 are provided in the cover 42 of the door trim 40 to protrude toward the clip 41 at the positions of opposing walls 75 that oppose the clip 41 in a width direction of the vehicle. As illustrated in FIG. 8, the protrusions 76 are formed to extend continuously in a longitudinal direction (a vertical direction) of the cover 42. The protrusions 76 are formed in the opposing walls 75 to correspond to windows 77 in a front and rear direction of the vehicle. Each window 77 extends through the clip 41 in a width direction of the vehicle. Thus, for example, a part of each protrusion 76 intrudes the corresponding window 77 and engages with engagement sides 77a (see FIG. 8) of the window 77 in a longitudinal direction of the cover 42. Thus, a positional offset between the cover 42 and the clip 41 is prevented in a longitudinal direction of the cover 42.

Next, the operations and advantages characteristic of the second embodiment will be described.

(1) The cover 42 includes protrusions 76 that constitute engaging portions. The protrusions engage with the engagement sides 77a of the window 77 of the clip 41 in a longitudinal direction of the cover 42. Provision of the protrusions 76 in the cover 42 prevents positional offset between the cover 42 and clip 41 in a longitudinal direction of the cover 42. By pressing the projecting wall 34a into the holding portions 73 formed in the cover 42 made of rubber, the projecting wall 34a is unlikely to be injured compared to the case where the projecting wall 34a is directly pressed into the clip 41.

The above embodiments of the present invention may be modified as follows.

With respect to the holding portions 41a, 73 of the above embodiments, a retaining structure may be added to improve a holding force for holding the projecting wall 34a. For example, FIGS. 10 and 11 illustrate examples in which a retaining structure is added to the holding portions 73 of the second embodiment.

Figure 10:
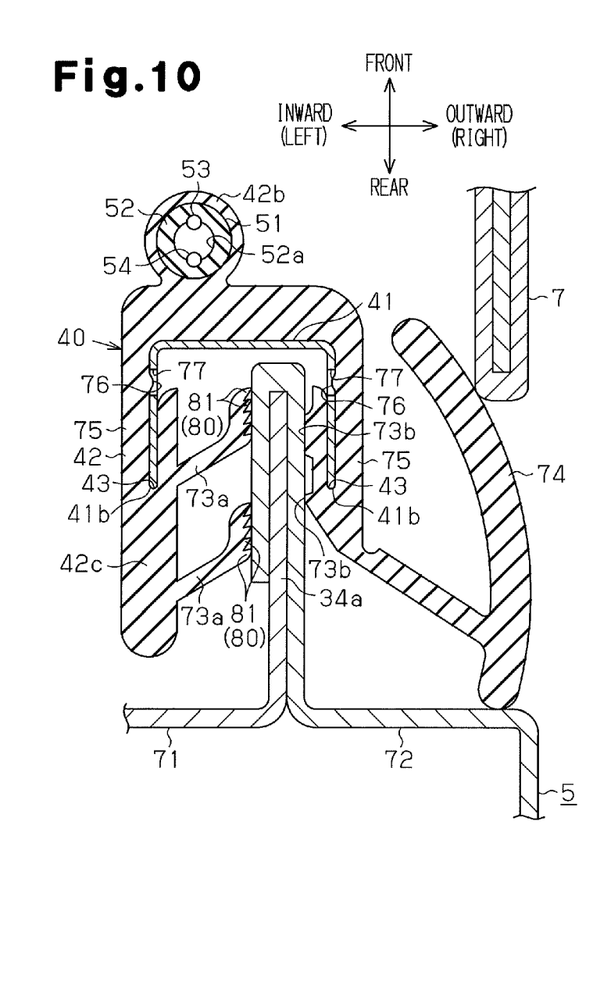
FIG. 10 is a cross-sectional view of another embodiment of a door trim for a vehicle.
Figure 11:
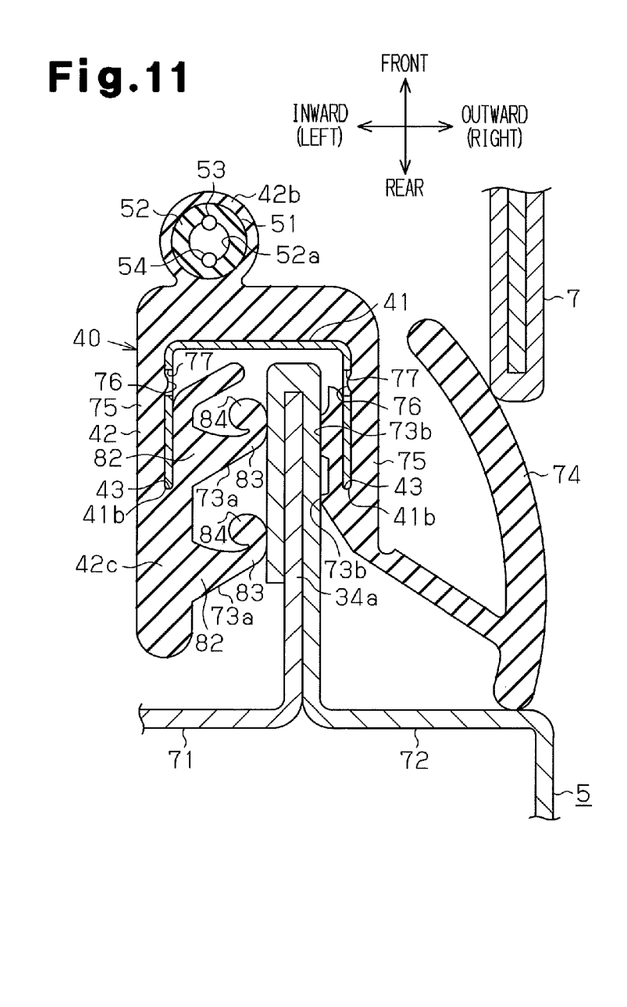
FIG. 11 is a cross-sectional view of another embodiment of a door trim for a vehicle.

As illustrated in FIG. 10, two holding portions 73a are formed on the side wall 42c on the inner (left) side of the cover 42 and extend at an angle toward the front of the vehicle (toward the foreign object detection sensor 51) as the holding portions 73a extend inward in a width direction of the cover 42. Both a pair of the holding portions 73a on the inner side of the vehicle and a pair of the holding portions 73b on the outer side of the vehicle are provided in a front and rear direction. Similar to the clips 41 of the above embodiments (see FIG. 3), these pairs of the holding portions 73a and the holding portions 73b are disposed at equal intervals in a longitudinal direction of the cover 42. In the configuration where the cover 42 is curved in a longitudinal direction thereof as in the above embodiments, molding of the holding portions becomes difficult if the holding portions are continuous in a longitudinal direction of the cover 42. However, by spacing the holding portions 73a, 73b in a longitudinal direction of the cover 42, the holding portions 73a, 73b are easily molded while conforming to the curve of the cover 42 in a longitudinal direction of the cover 42. Reduction of the material forming the holding portions 73a, 73b is also achieved.

At the distal end of each holding portions 73a on the inner side of the vehicle that contacts the projecting wall 34a in a width direction of the cover 42, a group of protrusions 80 consisting of a plurality of protrusions 81 are formed. Protrusions 81 are arranged in a front and rear direction of the vehicle and formed linearly in the longitudinal direction of the cover 42 (in a direction perpendicular to the paper of FIG. 10). Each protrusion 81 inclines forward as it extends toward inward in a width direction of the cover 42. Thus, for example, when a load in a forward direction of the vehicle is applied to the cover 42 to disengage the cover 42 from the projecting wall 34a, the projecting wall 34a is hold with the holding portions 73a, 73b, and the projecting wall 34a is caught by the group of protrusions 80 of each holding portion 73a. Thus, disengagement of the projecting wall 34a from the holding portions 73a, 73b is prevented. Thus, in the configuration illustrated in FIG. 10, a retaining structure of the group of protrusions 80 improves the retaining force of the projecting wall 34a by each holding portion 73a, 73b.

FIG. 10 illustrates an example where a group of protrusions 80 is provided in the holding portions 73 of the second embodiment. However, the invention is not limited thereto. Instead, a group of protrusions 80 may be provided in the holding portions 41a of the first embodiment.

FIG. 11 illustrates an example where a retaining structure in the form of a wedge is provided in each holding portion 73a. Specifically, in each holding portion 73a, a base portion 82 that extends from the side wall 42c of the cover 42 on the outer side of the vehicle has a greater width in a front and rear direction of the vehicle, and the thickness in a front and rear direction of the vehicle becomes smaller as the holding portion 73a extends from the base portion 82 to inward in a width direction of the cover 42. At the distal end (most inward end) of the holding portions 73a, a thickened portion 84 is formed via bent a portion 83 which is the thinnest among the portions of the holding portion 73a in front and rear directions of the vehicle. The thickened portion 84 is bent in a forward direction of the vehicle from the bent portion 83.

In the case of these holding portions 73a, for example, when a load in the forward direction of the vehicle is applied to the cover 42 to disengage the cover from the projecting wall 34a, friction force between the holding portion 73a and the projecting wall 34a is applied to each holding portions 73a from the rearward of the vehicle. Then, since the bent portion 83 is made thinner than the base portion 82, the friction force between the holding portions 73a and the projecting wall 34a acts to deform the thickened portion 84 at the distal end of the holding portions 73a to fold over more rearwardly than the bent portion 83. Since the base portion 82 of the holding portions 73a is thicker in the front and rear directions of the vehicle, rigidity of the base portion 82 is high, and the base portion 82 is hard to deform in the rearward direction of the vehicle even if the base portion 82 experiences such friction force. Since there is no gap between the projecting wall 34a and the thickened portion 84 required to fold over the thickened portion 84 in a rearward direction of the vehicle, the thickened portion 84 stops like a wedge in contact with the projecting wall 34a when the thickened portion 84 receives the rearward friction. Thus, even if a load is applied to the cover 42 in a forward direction of the vehicle, disengagement of the projecting wall 34a from the holding portions 73a, 73b is prevented. This retaining structure improves the retaining force of the projecting wall 34a by each holding portion 73a, 73b.

In the configuration where the holding portions 73a, 73b are displaced at predetermined intervals, retaining strength tends to decrease. By providing the holding portions 73a, 73b with any one of the retaining structures as described above, the retaining force is effectively improved.

In each embodiment as described above, the foreign object detection sensor 51 is a pressure sensor. However, the foreign object detection sensor 51 is not limited thereto and may be a proximate sensor. Further, a foreign object detection sensor 51 using both a pressure sensor and a proximate sensor may be used to detect a foreign object X.

In each embodiment as described above, the foreign object detection sensor 51 is provided in the door trim 40. However, the foreign object detection sensor 51 may be omitted. In that case, a sensor holder 42b of the cover 42 may be omitted.

In each embodiment as described above, a plurality of the clips 41 are arranged at equal intervals in a longitudinal direction of the cover 42. However, the arrangement of the clips 41 is not limited thereto. The clip 41 may be arranged at unequal intervals along the longitudinal direction of the cover 42. Moreover, instead of providing a plurality of the clips 41 to the single cover 42, one clip 41 may be provided to the single cover 42.

Figure 6:
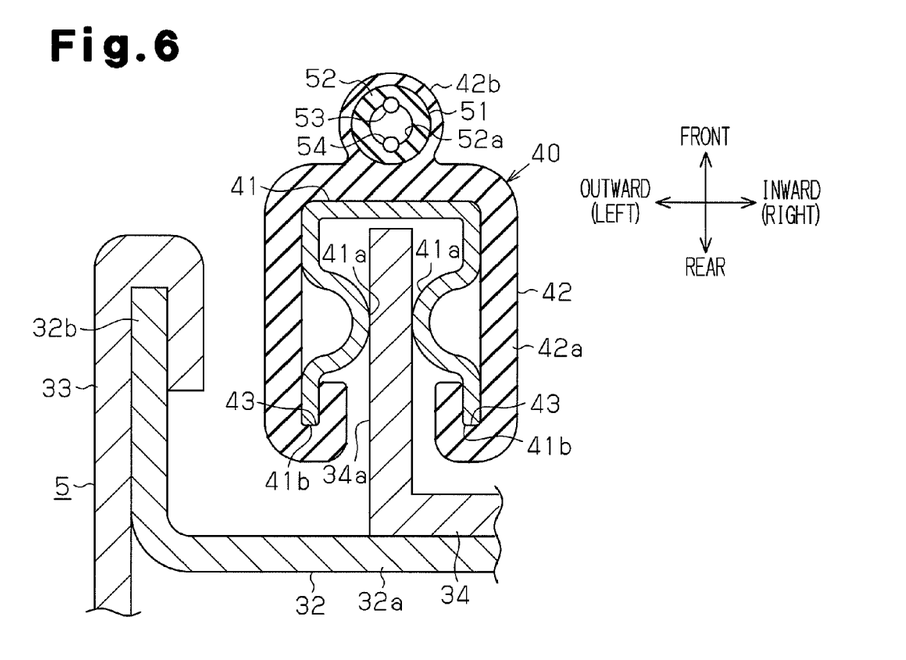
FIG. 6 is a cross-sectional view of another example of a door trim for a vehicle.
Figure 7:
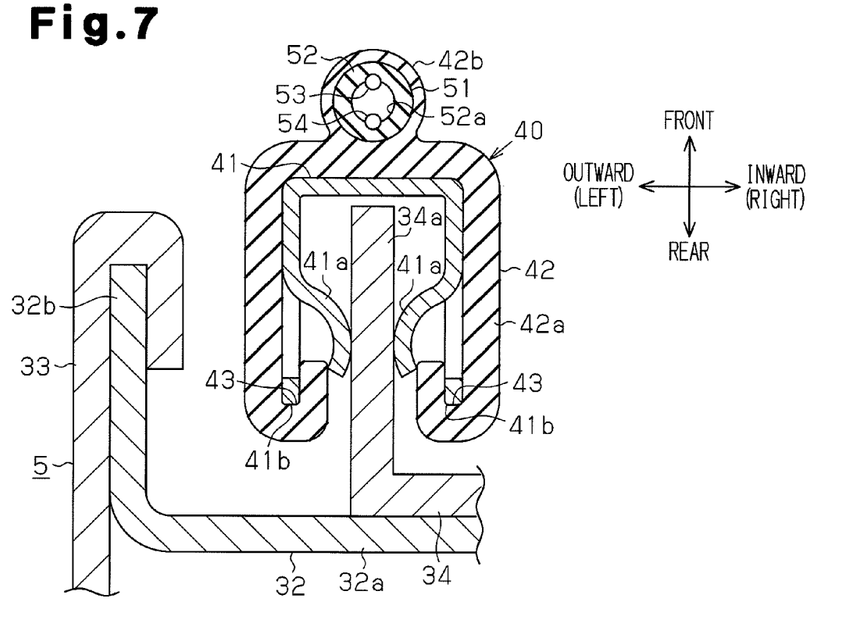
FIG. 7 is a cross-sectional view of another example of a door trim for a vehicle.

In the first embodiment, the holding portions 41a are formed by raising a part of the clip 41. Instead, for example, as illustrated in FIG. 6, the holding portions 41a may be formed by deforming a part of the clip 41 in a curved shape. Moreover, as illustrated in FIG. 7, the holding portions 41a may be formed by raising and then deforming a part of the clip 41.

In each embodiment as described above, the fitting portions 43 are provided in the cover 42. However, the fitting portions 43 may be provided in the clip 41.

In each embodiment as described above, the cover 42 is made of rubber. Instead, the cover 42 may be formed of resin other than rubber.

In each embodiment as described above, the clip 41 is made of metal material. Instead, for example, the clip 41 may be made of resin.

In each embodiment as described above, the foreign object detection sensor is provided at the door panel 5 that is slidable to open or close an opening (passenger's opening 4) disposed at the lateral side of the vehicle. Instead, the foreign object detection sensor may be provided at the door panel 5 that opens or closes an opening (rear gate) disposed at the rear side of the vehicle. Further, the foreign object detection sensor may be provided at the vehicle (at the periphery of an opening) opposing the door panel 5.

In each embodiment as described above, the foreign object detection sensor is provided at the door panel 5 that is slidable. Instead, the foreign object detection sensor may be provided at the door panel 5 that is rotatable with respect to the vehicle 3 via one or more hinges.

In each embodiment as described above, a door trim 40 is provided at the door panel 5. Additionally, the door trim 40 may be also provided at the center pillar 7. Alternatively, the door trim 40 may be provided only at the center pillar 7.

What is claimed is:

1. A door trim for a vehicle, the vehicle comprising a fixed body including an opening and a movable body that opens and closes the opening, at least one of the fixed body and the movable body including an attachment portion, the door trim comprising an elongate shape and a cover, the cover being attached along the attachment portion in a manner to cover the attachment portion, the door trim comprising:
    a reinforcing member for reinforcing the cover, wherein the reinforcing member is provided between the cover and the attachment portion to directly oppose the attachment portion, and to be covered by the cover,
    wherein at least one of the cover and the reinforcing member is directly assembled to the attachment portion.

2. The door trim for a vehicle according to claim 1, wherein the one of the cover and the reinforcing member includes an engaging portion, wherein the engaging portion engages with the other of the cover and the reinforcing member that is directly assembled in a direction opposite from the direction of the assembling.

3. The door trim for a vehicle according to claim 1, wherein the one of the cover and the reinforcing member includes an engaging portion that extends in a longitudinal direction of the cover so that the reinforcing member engages with the other of the cover and the reinforcing member in a longitudinal direction of the cover.

4. The door trim for a vehicle according to claim 1, wherein the one of the cover and the reinforcing member includes one or more holding portions that elastically hold an attachment piece attached to the attachment portion.

5. The door trim for a vehicle according to claim 4, wherein the holding portion is integrally formed with the reinforcing member by bending or raising a part of the reinforcing member.

6. The door trim for a vehicle according to claim 4, wherein the holding portion includes a retaining structure for preventing disengagement from the attachment piece.

7. The door trim for a vehicle according to claim 6, wherein the holding portion is a plurality of holding portions arranged at predetermined intervals in a longitudinal direction of the cover.

8. The door trim for a vehicle according to claim 6, wherein the retaining structure comprises a group of protrusions provided in the holding portion.

9. The door trim for a vehicle according to claim 6, wherein the retaining structure has a shape corresponding to a wedge against the attachment piece.

10. The door trim for a vehicle according to claim 1, wherein the reinforcing member comprises a plurality of reinforcing members provided with the cover, wherein the plurality of reinforcing members are arranged at predetermined intervals in a longitudinal direction of the cover.

11. The door trim for a vehicle according to claim 1, wherein the cover includes a holder for holding a foreign object detection sensor, wherein the foreign object detection sensor detects a foreign object between the movable body and the fixed body.

* * * * *